United States Patent Office 2,773,799
Patented Dec. 11, 1956

2,773,799
COMPOUNDS, PREPARATION AND FUNGICIDAL COMPOSITIONS OF POLYHALOGENO ALKYL POLYCYCLYL KETONES

Hsing Yun Fan, Denver, Colo., assignor to Shell Development Company, New York, N. Y., a corporation of Delaware No Drawing. Application November 2, 1953, Serial No. 389,857

44 Claims. (Cl. 167—30)

This invention relates to new and useful polyhalogeno alkyl polycyclyl ketones and to novel compositions of matter comprising from one to a plurality of such novel ketones. The invention further pertains to new and useful fungicidal compositions of matter comprising one or more of the novel ketones of the invention, and still further to the control, prevention, and killing of fungi by application, to the fungi or to things likely to be attacked thereby, of the novel polyhalogeno alkyl ketones of the invention. In a still further aspect, the invention pertains to the control, prevention, and killing of other micro-organisms than fungi, by application of the novel polyhalogeno alkyl ketones of the invention. Chemical methods for preparing the novel compounds and products of the invention also form a part of the invention.

There are known a limited number of polychlorinated polycyclic hydrocarbons which have been used with considerable success as insecticides. Among these may be mentioned chlordane, aldrin, DDT, heptachlor, isodrin, and the like. Although the availability of these and similar compounds has contributed greatly to the control of insects, these compounds in general have found little if any practical application in the control of micro-organisms, particularly those micro-organisms which are destructive or injurious to higher forms of plant and animal life, such as fungi. Furthermore, in a number of cases these known polychlorinated compounds are highly toxic to mammals. As a result, considerable care must be used in their application under circumstances that might subject mammals to their toxic action, and in a few cases their mammalian toxicity has been sufficient to severely restrict their permitted applications.

The number of compounds known to be effective as fungicides is limited in number. By far the greater part of all fungicides used at the present time are compounds of sulfur and copper. Certain organic compounds are known to exert a fungicidal action, although they have not been entirely satisfactory for one or more reasons. In some cases the known compounds exert excessive phytotoxicity, detracting from their usefulness in agricultural fields, while in the same or in other instances excessive mammalian toxicity is encountered. The copper and sulfur compounds, because of their relatively low cost may be applied in relatively heavy dosages to trees, garden crops, and the like, but in general they do not exhibit the specific high toxicity that in many cases is desired for a good fungicide. There has been need for chemical compounds which exhibit high toxicity toward fungi. There also has been need for improved fungicides suitable for agricultural purposes. There has been a further need for improved fungicides having a lasting effect such that they may be applied to articles of manufacture as a means of protection against future attack by fungi. There furthermore has been need for effective fungicides which do not exhibit undesirable mammalian toxicity and in particular, which can be used for treating various forms of mycosis in man and the other mammals.

In accordance with the present invention there now is provided a new and valuable group of synthetic organic compounds which have been found to possess, inter alia, a remarkably high toxicity towards fungi. These new compounds are certain polyhalogeno alkyl polycyclyl ketones. Unlike the known polychlorinated polycyclic hydrocarbons which are useful as insecticides, including those referred to hereinbefore, the polyhalogeno alkyl polycyclyl ketones of this invention exert a rather specific toxic action towards fungi and other micro-organisms. Furthermore, they have only low if any toxicity towards mammals. Indeed, certain of the products of this invention have been tested and found to be non-toxic towards test animals when applied in such amounts as to be highly fungicidal. A limited number of the products of the invention have been tested clinically and have been found to be effective as mycotic agents without evidence of undesirable secondary reactions in the patient. The new polyhalogeno alkyl polycyclyl ketones of the invention thus are widely applicable as fungicides in agricultural and industrial fields, the evidence that has been accumulated indicates that at least in a number of cases they can be safely applied to the clinical treatment of mycosis in human beings, and they apparently can be safely applied to the treatment of fungus infections in domestic animals.

These new and remarkably valuable compounds which are provided for the first time by the present invention are certain halogen-substituted alkyl polycyclyl ketones. In these novel ketones, the ketonic carbonyl group is directly attached, by one valency of the carbonyl carbon, to an alkyl or halogen-substituted alkyl group. The second valency of the carbonyl carbon is attached to a polycyclic radical characterized by the presence of two fused five-membered carbocyclic rings having three carbon atoms in common to the two rings and further characterized, in some cases, by the presence of a third, triatomic ring formed by a bond interconnecting two of the peripheral carbons of the respective pentatomic rings. There are substituted on the polycyclic structure and the said alkyl group together, a plurality of halogen atoms.

Described more specifically, the novel polyhalogeno alkyl polycyclyl ketones of this invention can be represented by the planar structural formula

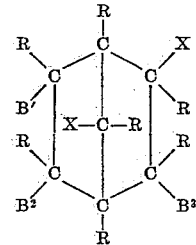

in which one X represents the group

and the other X represents a member of the group consisting of hydrogen and halogen, each R (including those forming part of the said group

is selected, independently of the others, from the group consisting of hydrogen, halogen, and lower alkyl (which lower alkyl may be halogen-substituted), with the proviso that not less than two of the substituents represented by X and R together be halogen. More particularly described, each R may be halogen, hydrogen, or the methyl radical (which may be halogen-substituted), with the proviso that not over one R represents a methyl radical and that not less than two of the substituents represented by X and R together be halogen. B', B², and B³ each represent valence bonds satisfied by attachment to one of the group consisting of hydrogen and carbon with the proviso that when B² represents a valence bond satisfied by attachment to hydrogen B' and B³ also both represent valence bonds satisfied by attachment to hydrogen and with the further proviso that when either one of B' or B³ represents a valence bond satisfied by attachment to carbon, B² also represents a valence bond satisfied by attachment to carbon and together with the said one of B' or B³ forms a valence bond between the two carbons, and the other of B' and B³ represents a valence bond satisfied by attachment to hydrogen. Thus, B', B², and B³ each represents hydrogen atoms or B' and B² together or B² and B³ together represent a valence bond between the two carbon atoms while B³ or B', respectively, represent hydrogen, thus forming an ethylenic linkage between the carbons to which B' and B² are attached or a cyclopropane ring including the carbons to which B² and B³ are attached. Such structures may be represented subgenerically by the planar structural formulas

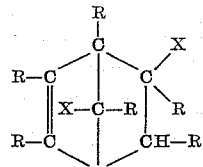

and

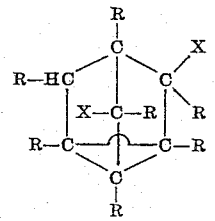

in which R and X are defined as hereinabove.

It has been observed in conjunction with the present invention that the tricyclic structure represented in the second of these two subgeneric formulas exhibits certain chemical characteristics similar to those of an ethylenically unsaturated compound, that is to say, to those of the ethylenically unsaturated structure represented in the first of the two subgeneric structural formulas. Thus, the cyclopropane ring appears to be susceptible to attack by acidic reagents, although less so than the ethylenic bond of the foregoing bicycloheptane structure, with the result that in certain, but not all cases, the two structures exhibit similar chemical characteristics. Indeed, in many instances it appears that both the foregoing ethylenically unsaturated structure and tricyclic structure are formed simultaneously by procedures which may be employed according to the invention; the products which I claim may consist of one or more compounds having but one of the preceding subgeneric type structures, or compounds of both subgeneric structures may be present therein.

The nature and scope of the novel chemical products described by means of the preceding formulas and the methods whereby they are obtained will be better understood by reference to the following descriptions of preparative methods of the present invention.

Methyl 2-norcamphanyl ketone, having the planar structural formula

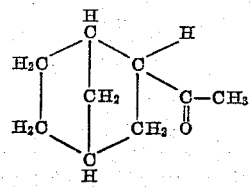

is prepared by reacting cyclopentadiene and methyl vinyl ketone by means of the Diels-Alder reaction and hydrogenating the resultant adduct, 2-acetyl-bicyclo-(2.2.1)-5-heptene, as by catalytic hydrogenation. Upon brominating the methyl 2-norcamphanyl ketone by treatment with about two molecular proportions of bromine, preferably at about room temperature, there are introduced two atoms of bromine yielding the dibromo methyl 2-norcamphanyl ketone of the probable structure

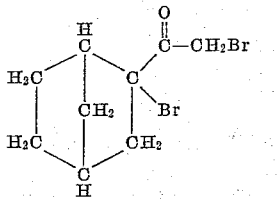

This alpha, alpha' dibromo ketone has been found to be highly toxic against *Streptomyces scabies* (potato scab), inhibiting the growth thereof in a standard culture medium when present at a concentration of only 8 to 16 parts per million. On the other hand, if the methyl 3-norcamphanyl ketone is brominated under such conditions that but one atom of bromine is introduced, the resulting monobromo methyl 3-norcamphanyl ketone does not inhibit the growth of *Streptomyces scabies* when present at even as high a concentration as 125 parts per million.

By a modified procedure, a tribromo methyl 3-norcamphanyl ketone can be prepared according to the invention. Upon addition of HBr to 2-acetyl-bicyclo-(2.2.1)-5-heptene, as by bubbling gaseous HBr through a chilled solution of the 2-acetyl-bicyclo(2.2.1)-5-heptene in heptane or other inert preferably hydrocarbon solvent, with ultra violet illumination, there is obtained a monobromo-2-norcamphanyl methyl ketone which upon bromination (introducing two additional atoms of bromine) yields a tribromo derivative of methyl 2-norcamphanyl ketone melting when pure at about 93–94° C. and, in common with the dibromo derivative mentioned above, exhibiting high toxicity towards *Streptomyces scabies* and other fungi. The probable structure of this tribromo derivative can be represented as follows in planar representation

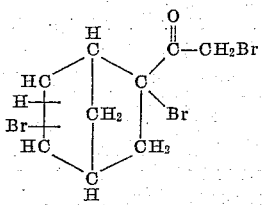

Methyl substituted products comparable to the foregoing forming a part of the present invention can be prepared similarly by substituting for the cyclopentadiene a methyl-substituted cyclopentadiene, i. e., 1-methyl-1,3-cyclopentadiene, 2-methyl-1,3-cyclopentadiene, or 5-methyl-1,3-cyclopentadiene. Similarly, in place of the methyl vinyl ketone there may be used other alpha,beta-ethylenically unsaturated ketones such as ethyl vinyl ketone, methyl isopropenyl ketone, propyl vinyl ketone, butyl vinyl ketone, amyl vinyl ketone, methyl 1-butyl-1-ethenyl ketone, hexyl isopropenyl ketone, ethyl isopropenyl ketone, isobutyl vinyl ketone, and their homologs and analogs. Such other alpha,beta-ethylenically unsaturated ketones should have as the alkyl group bonded to the carbonyl carbon an alkyl group containing hydrogen in the alpha position, permitting alpha halogenation of the alkyl group upon halogenation of the alkyl norcamphanyl ketone.

The Diels-Alder reaction of the alpha,beta-ethylenically unsaturated ketone and the cyclopentadiene or alkyl-substituted cyclopentadiene may be carried out by procedures known for the Diels-Alder reaction, such as by heating the selected reactants together, preferably in about equimolar amounts, in an autoclave or by heating a solution of the reactants in an inert solvent, such as isooctane or benzene. Temperatures of from about 50° C. to about 150° C. are generally suitable. In some cases the mildly exothermic reaction will proceed even at normal room temperatures, although operation at moderately elevated temperatures invariably accelerates the reaction. Hydrogenation of the adduct to the corresponding alkyl bicyclo(2.2.1)-heptyl ketone may be carried out by conventional methods, hydrogenation of an alcoholic solution of the adduct over Raney nickel or other known hydrogenation catalyst being satisfactory. Halogenation of the hydrogenated adduct (or of the hydrohalogenated adduct) to yield novel products of the invention is conveniently carried out by treating a solution of the intermediate in an inert solvent, such as a paraffinic hydrocarbon solvent, with the halogen, e. g., liquid bromine or gaseous chlorine. The amount of the halogen should be at least sufficient, based on theory, to yield a reaction product containing two or more atoms of halogen per molecule since it is the novel polyhalogeno alkyl polycyclic ketones that have been found to possess the remarkable and desirable attributes which are desired in accordance with the invention. The halogenation may be carried out at about room temperature or somewhat above; those skilled in the art will appreciate that variations in the halogenation conditions are possible and, in this aspect, the invention is not to be regarded as being an unduly limited one. In place of the halogens per se, other known halogenating agents, such as sulfuryl chloride, N-bromosuccinimide, and the like, can be employed to effect the introduction of the desired halogen.

The preceding paragraphs have presented a description of a method, which is illustrated in detail in the several examples hereinafter, whereby novel products of the invention are obtained by first forming a Diels-Alder reaction product of a cyclic dienic hydrocarbon and an alpha,beta-ethylenically unsaturated ketone and subsequently introducing a plurality of atoms of halogen into the molecule of the resulting intermediate. Similar but yet different products of the invention can be prepared by first introducing halogen into the diene hydrocarbon to yield a polyhalogeno cyclodiene and then forming a Diels-Alder adduct of this polyhalogeno cyclodiene and an alpha,beta-ethylenically unsaturated ketone. The alpha,beta-ethylenically unsaturated ketones which may be employed are those which may be reacted with the dienic hydrocarbon in the embodiment of the invention previously described herein.

Thus, cyclopentadiene can be chlorinated by known procedures, such as by the Strauss reaction with aqueous sodium hypochlorite, to yield the known hexachlorocyclopentadiene. The hexachlorocyclopentadiene then may be combined via the Diels-Alder reaction with methyl vinyl ketone to yield the novel 1,4,5,6,7,7-hexachlorobicyclo(2.2.1)-5-hepten-2-yl methyl ketone. This product has shown appreciable fungicidal activity when tested against Streptomyces scabies. By brominating it with molecular bromine there has been obtained a product having the probable planar structure represented by the name 1,4,5,6,7,7-hexachlorobicyclo(2.2.1)-5-hepten-2-yl bromomethyl ketone. This latter product, compared to the 1,4,5,6,7,7 - hexachlorobicyclo(2.2.1) - 5-hepten-2-yl ketone, exhibits a remarkably enhanced fungicidal activity which appears, from a consideration of the structures of the two compounds, to be attributable to the introduction of halogen in alpha position relative to the carbonyl group. The probable reactions which are involved may be described by the following equations in which the structures are shown in planar representation.

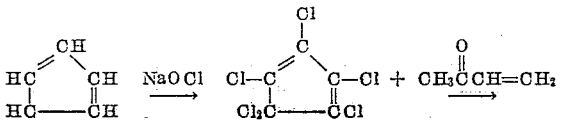

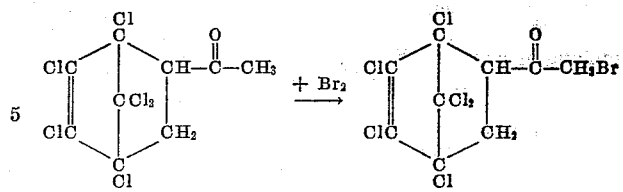

Instead of employing hexachlorocyclopentadiene for adduction with the alpha,beta-ethylenically unsaturated ketone there may be employed a polychlorocyclopentadiene containing fewer than six atoms of halogen. Thus, we may prepare pentachlorocyclopentadiene or even tetrachlorocyclopentadiene by reduction of hexachlorocyclopentadiene with nascent hydrogen and form Diels-Alder adducts of these intermediates with the alpha-beta-ethylenically unsaturated ketone. 1,2,3,4-tetrachloro-1,3-cyclopentadiene readily forms a Diels-Alder adduct with methyl vinyl ketone, the adduct having the probable planar structure represented by the chemical name 1,4,5,6 - tetrachlorobicyclo(2.2.1) - 5 - hepten-2-yl methyl ketone. Consideration of the three-dimentional structural formula for the adduct shows there to be two possible stereo-isomers (considering only the geometry of the methano bridge and the acetyl-substituted ring carbon atom) namely, the form which in accordance with customary nomenclature can be termed the endo isomer and the second form, the exo isomer. If the planar structural formula for 1,4,5,6-tetrachlorobicyclo(2.2.1)-5-hepten-2-yl methyl ketone is written

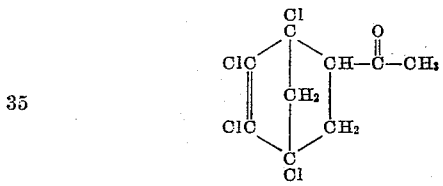

the unsubstituted methano bridge can be regarded as projecting above the plane formed by the paper, with the other ring carbons lying in that plane. In one of the two stereo-isomers—the exo isomer—the acetyl group will lie almost parallel to and above the plane of the paper and the hydrogen atom on the carbon atom bearing the acetyl group can be conceived as lying almost perpendicular to and below the plane. In the endo isomer the directions occupied by the acetyl group and the adjacent hydrogen atom can be regarded as being reversed. Thus, the two following three-dimensional structural formulas for the stereoisomers of 1,4,5,6-tetrachlorobicyclo(2.2.1)-5-hepten-2-yl methyl ketone are readily visualized:

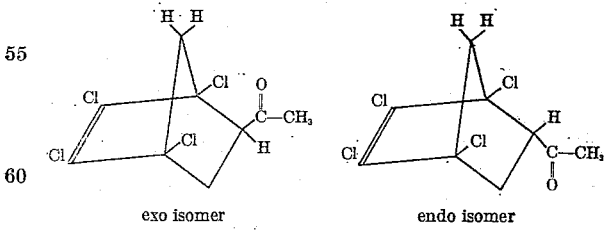

exo isomer          endo isomer

It has, indeed, been found possible to prepare two stereoisomeric forms of 1,4,5,6-tetrachlorobicyclo(2.2.1)-hepten-2-yl methyl ketone by conducting the Diels-Alder reaction of 1,2,3,4-tetrachloro-1,3-pentadiene and methyl vinyl ketone at between about 25° and about 40° C., followed by careful purification of the crude reaction product by fractional crystallization. One isomer melts, after recrystallization, at about 67.5–68.5° C. and the other isomer melts, after recrystallization, at about 50–51° C. Treatment of the isomer which melts at about 67.5–68.5° C. with sodium methoxide causes it to rearrange to the form of the isomer melting at 50–51° C., but the reverse transformation does not take place. It is our present belief that the isomer melting at about 67.5°–68.5° C. is the endo isomer and that the isomer melting at about 50–51° C. is the exo isomer.

It has been discovered in accordance with the invention that, by introducing halogen into the molecule of the 1,4,5,6-tetrachlorobicyclo(2.2.1)-5-hepten-2-yl methyl ketones described above, in alpha position relative to the carbonyl carbon atom, as by reaction of such ketones with molecular bromine, there are obtained novel products which exert a highly toxic action towards various fungi. Thus, the invention provides novel fungicidal agents by preparing a polyhalogenocyclopentadiene via halogenation of the cyclopentadiene, preparing a halogen-substituted adduct of the polyhalogenocyclopentadiene and an alpha,beta-ethylenically unsaturated ketone via the Diels-Alder reaction, or "diene synthesis," and then halogenating the adduct to form a polyhalo alkyl polycyclic ketone having halogen in at least one of the positions alpha to the carbonyl group.

Halogenation (bromination) of the exo isomer of 1,4,5,6-tetrachlorobicyclo(2.2.1)-5-hepten-2-yl methyl ketone under conditions regulated to introduce but one atom of bromine into the molecule (e. g., in solution in the cold, such as at about 0–5° C., and without application of actinic energy) leads to the formation of two monobromo compounds, one the alpha-monobromoketone and the other the alpha'-monobromoketone. Of these two ketones, one melts, after recrystallization, at about 95–96° C. while the other melts, after recrystallization, at about 81–82° C. Similar halogenation of the endo isomer of 1,4,5,6-tetrachlorobicyclo(2.2.1)-5-hepten-2-yl methyl ketone likewise leads to two isomeric monobromo ketones, one melting, after recrystallization, at about 56–57° C. and the other melting, after recrystallization, at about 95–96° C. Assuming that the bromination of the respective isomers of the 1,4,5,6-tetrachlorobicyclo(2.2.1)-5-hepten-2-yl methyl ketone proceeds via an ionic mechanism, the formation of the three isomeric monobromides apparently can be accounted for by assigning to the isomer melting at 95–96° C. the structure represented by the name endo (or exo) 1,4,5,6-tetrachlorobicyclo(2.2.1)-5-hepten-2-yl bromomethyl ketone and to the isomers melting at 56–57° C. and 81–82° C. the structures of the endo and exo isomers of 2-bromo-1,4,5,6-tetrachlorobicyclo(2.2.1)-5-hepten-2-yl methyl ketone.

Although the halogenation (bromination) of the adduct of the alpha-beta-ethylenically unsaturated ketone and the polyhalogenocyclopentadiene to yield an alpha-halogeno substituted alkyl polyhalogenobicyclo(2.2.1)-5-hepten-2-yl ketone can be carried out under conditions calculated to lead to the introduction of but one atom of halogen, the halogenation may also be carried out according to the invention under conditions calculated to lead to introduction of two or more atoms of the halogen. For example, bromination of both the endo and the exo isomers of 1,4,5,6-tetrachlorobicyclo(2.2.1)-5-hepten-2-yl methyl ketone at ambient temperatures or somewhat above (say, 20° to 40° C.) and under the influence of actinic light leads to a dibromo compound melting, after recrystallization, at about 118.5–119.5° C. and having the probable structure of 2-bromo-1,4,5,6-tetrachlorobicyclo-(2.2.1)-5-hepten-2-yl bromomethyl ketone. This product, in common with the other novel alpha-halogeno substituted polyhalogeno bicyclo(2.2.1)heptenyl alkyl ketones and alphahalogeno substituted polyhalogeno bicyclo-(2.2.1)-heptenyl alkyl ketones of the invention, finds considerable utility as a fungicide.

In the methods described in the foregoing paragraphs novel bicyclic ketones of the present invention are prepared by forming both the requisite bicyclic structure and the ketonic structure via a Diels-Alder diene synthesis utilizing a cyclopentadiene (which may already be halogen-substituted) as the diene and an alpha,beta-ethylenically unsaturated ketone as the dienophile, with subsequent halogenation (at least where the diene is unsubstituted cyclopentadiene) of the Diels-Alder adduct so as to introduce one or more atoms of halogen in positions alpha to the carbonyl group. According to a somewhat different method of synthesis, novel ketones of the invention may also be prepared by taking an unsaturated bicyclic hydrocarbon which already contains the requisite bicyclic structure (two pentatomic carbocyclic rings sharing between them three carbon atoms) and reacting this bicyclic unsaturated hydrocarbon with an acyl halide of a carboxylic acid, such as a fatty acid halide, and subsequently halogenating the resulting intermediate to obtain the desired polyhalogeno alkyl polycyclyl ketone.

The method may be illustrated, in the simplest case, by the reaction of acetyl chloride with bicyclo(2.2.1)-2-heptene. There is obtained as the intermediate product 3-chlorobicyclo(2.2.1)-2-heptyl methyl ketone. This intermediate, upon bromination, is converted to a dibromo derivative which has exhibited excellent properties as a fungicide. The reactions which are believed to occur can be described as follows

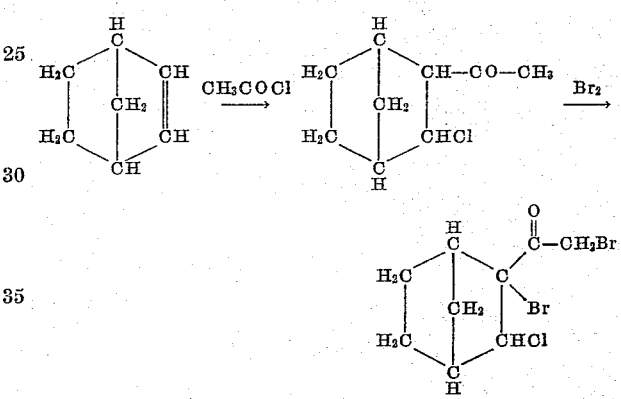

As the unsaturated bicyclic hydrocarbon there may be employed in place of bicyclo(2.2.1)-2-heptene an alkyl-substituted bicyclo(2.2.1)-2-heptene, such as a methyl bicyclo(2.2.1)heptene or an ethyl bicyclo(2.2.1)heptene, or a halogen-substituted bicyclo(2.2.1)-2-heptene. Furthermore, instead of the monoethylenically unsaturated hydrocarbon containing the requisite bicyclic ring structure there may be employed a dienic bicyclic hydrocarbon containing the requisite two fused pentatomic rings and having two, instead of the one, ethenylidene bridges. An example of such a dienic bicyclic hydrocarbon is bicyclo(2.2.1)-2,5-heptadiene, which may be prepared by Diels-Alder reaction between cyclopentadiene and acetylene, as well as the monomethyl substitution products of bicyclo(2.2.1)-2,5-heptadiene. As the acyl halide there preferably is employed acetyl chloride. However, other acyl halides than acetyl chloride may be employed, such as propionyl chloride, butyryl chloride, isobutyryl chloride and the higher fatty acid halides according to the desired chain-length of the alkyl groups of the ultimate polyhaloalkyl polycyclyl ketone. In lieu of the acyl chlorides there may be employed acyl bromides; halogen-substituted acyl halides may also be employed.

The reaction between the unsaturated bicyclic hydrocarbon or halogen-substituted unsaturated bicyclic hydrocarbon and the acyl halide is readily carried out by adding the acyl halide to the bicyclic unsaturated hydrocarbon in the presence, where necessary, of a suitable catalyst. The reaction can be carried out either in the presence of a solvent, in the presence of an excess of one reactant, or in the presence of an excess of the other reactant. The reaction may also be carried out in a multi-phase system, where one reactant is predominantly in one phase and the other reactant is predominantly in another phase, in such a case vigorous agitation being desirable. The reaction of the acyl halide with the unsaturated bicyclic hydrocarbon, or derivative, may be carried out at temperatures ranging from about 0° C. to about 150° C. Pressure is not critical, although where one or both of the reactants would volatilize excessively at the operating temperature it obviously will be advantageous to apply pressure as required to reduce the volatilization of such reactant(s).

Catalysts which may be used to promote the addition of the acyl halide to the bicyclo(2.2.1)heptene or bicyclo(2.2.1)heptadiene reactant comprise acids in the ordinary sense, such as sulfuric acid or phosphoric acid, or strong acids in the more generalized sense. As the acid, using the term in its more generalized sense, there can be used the Lewis acids, for example, $AlCl_3$, $SnCl_4$, $ZnCl_2$, $FeCl_3$ and like compounds. These Lewis acids are, generally speaking, the compounds which ordinarily are referred to as the Friedel-Crafts catalysts.

The halogenation of the addition products of the acyl halide and the bicyclo(2.2.1)heptene or bicyclo(2.2.1)-heptadiene reactant may be carried out by direct treatment of the reaction product, with or without preceding purification or recovery treatment, with molecular halogen, e. g., $Cl_2$ or $Br_2$, or with other known halogenating agents, such as sulfuryl chloride, N-bromosuccinimide, etc. In general, conditions and procedures known to those skilled in the art for effecting halogenation of halogenatable organic compounds are applicable in the halogenation of the intermediate reaction product. One, two, three, or an even greater number of halogen atoms may be introduced in and by the halogenation treatment.

By addition of bromine to the reaction product of the acyl halide and the bicyclo(2.2.1)heptene or bicyclo-(2.2.1)heptadiene reactant in about equimolar proportions, preferably in the presence of an inert organic solvent such as $CCl_4$, pentane, hexachloroethane, or dibromodichloromethane, and generally at temperatures approximating the ambient temperatures (typically, from about 0° C. to about 50° C.), there is readily introduced one atom of bromine per mole of the reaction product. By increasing the amount of the added bromine proportionately there are obtained novel products of this invention formed by the introduction of two atoms of bromine per mole of the intermediate reaction product. Under more rigorous conditions, that is to say, at elevated temperatures up to about 100° C. and under the activating influence of actinic light, the halogenation can be carried out to introduce three atoms of the halogen per mole of the intermediate reaction product. In a similar manner, the dibromo derivative, produced under the less rigorous conditions of halogenation, may be further halogenated under the more rigorous conditions to yield the novel products containing three atoms of halogen per molecule.

Corresponding products may be prepared by chlorination.

A singularly outstanding product of this invention, which is noteworthy for its remarkably high toxicity towards a wide variety of microorganisms, is the product, or mixture of products, which is obtained upon introduction of a plurality of atoms of bromine into the intermediate product formed by reaction of bicyclo(2.2.1)-2,5-heptadiene and acetyl chloride. The reaction of bicyclo(2.2.1)-2,5-heptadiene with lower aliphatic acyl halides in the presence of Friedel-Crafts catalysts leads to reaction products which are mixtures of substances indicating the occurrence of at least two competing reactions. Besides the product formed by normal 1,2 addition of the acyl halide to one of the ethylenic linkages of the bicyclo diene, there is present at least one tricyclic compound formed, it is believed, by addition of the acyl halide to the bicyclic diene with accompanying rearrangement of the bicyclic structure to yield a saturated tricyclic structure, probably via an ionic mechanism. Moreover, concurrently with the rearrangement which yields a saturated tricyclic structure, there appears also to occur a second rearrangement which leads to the formation, from another portion of the reacting diene, of a halo-substituted bicyclo(2.2.1)heptenyl ketone having the carbonyl group bonded to the carbon atom of the methano bridge. An ionic mechanism for this latter rearrangement also appears to be likely.

Upon bromination (or hydrobromination and bromination) of the products thus obtained from bicyclo-(2.2.1)-2,5-heptadiene and acetyl chloride, there are obtained products which are singularly outstanding as fungicides and as toxicants for other microorganisms.

The individual compounds produced by the reaction of bicyclo(2.2.1)-2,5-heptadiene and acetyl chloride may be treated individually after separation, or the crude reaction product may be subjected to the hydrobromination or bromination. The hydrobromination is believed to lead to addition of HBr to ethylenic bonds and to the cyclopropane ring system; the bromination is believed to introduce bromine into one or both of the positions alpha to the carbonyl group.

The hydrobromination (when employed) and the bromination may be carried out according to more or less well-known methods for hydrobrominating and brominating organic compounds which are susceptible to these reactions. The hydrobromination desirably is carried out using a concentrated solution of HBr in a polar solvent, usually water, an alcohol, an ether, or an acid such as acetic acid, in the cold. More generally speaking, temperatures of from about −30° C. to about +50° C. may be employed for the hydrobromination. The HBr preferably is employed in excess, molar basis. The bromination may be carried out by treating a solution of the intermediate product preferably in an inert organic solvent, such as carbon tetrachloride, with bromine. Under relatively mild conditions of bromination, such as temperatures ranging from about 0° C. to about 50° C., up to two atoms of bromine per mole of intermediate product can be introduced according to the mole ratio of bromine to intermediate product. Under more severe conditions, such as temperatures up to 100° C. or more, and with the energizing influence of actinic light, even three or more atoms of bromine may be introduced by the bromination.

Where desired the novel polyhalogeno polycyclyl ketones of the present invention may be purified by methods which are generally understood by those skilled in the art, such as by crystallization from solution in appropriate solvents, by sublimation, or by fractional distillation. The degree of purification necessary in any given case will, of course, depend in part upon the intended end use for the particular product and, therefore, may be varied accordingly.

The following examples, which should not be misconstrued as limiting the invention, show specific novel products of the invention and methods useful for the preparation of the same.

In Example I, there is described the preparation of methyl bicyclo-(2.2.1)-2-heptyl ketone by hydrogenation of the Diels-Alder adduct of cyclopentadiene and methyl vinyl ketone, namely, methyl bicyclo(2.2.1)-5-hepten-2-yl ketone. In Examples II and III there are described preparations, according to the invention, of novel dibromo and dichloro derivatives, respectively, of this intermediate ketone. Example IV describes a modified procedure whereby a new and valuable tribromo derivative is obtained from the intermediate bicyclo(2.2.1)-5-hepten-2-yl ketone. The fungicidal activity imparted by the polybromination is illustrated hereinafter by comparison of the products of Examples II, IV and V.

EXAMPLE I

One hundred grams of methyl bicyclo(2.2.1)-5-hepten-2-yl ketone (prepared by Diels-Alder adduction of cyclopentadiene and methyl vinyl ketone) were dissolved in 100 ml. methanol. Two grams of Raney nickel catalyst were added. The mixture was shaken under 50 pounds mercury pressure in a hydrogenation vessel until one mole of hydrogen had been absorbed per mole of the methyl bicyclo(2.2.1)-5-hepten-2-yl ketone. Upon distillation of the product there were obtained 96 grams (87.5% yield) of methyl bicyclo(2.2.1)-2-heptyl ketone, boiling point 86–90° C. under 21 mm. mercury pressure. Refractive index ($n$ 32.5/D) 1.4680. *Analyses.*—Found, 78.0% C and 10.60% H; calculated for $C_9H_{14}O$, 78.3% C and 10.13% H. The planar structural formula for this product can be written as follows:

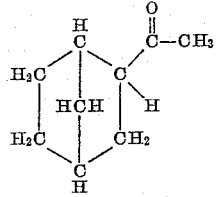

EXAMPLE II

To a solution of 40 grams of methyl bicyclo(2.2.1)-2-heptyl ketone in 200 ml. of $CCl_4$ there were added 92.8 grams of bromine (2 equivalents) dropwise with stirring over a period of four hours at about room temperature. The reaction mixture then was washed with 1% aqueous sodium bisulfite solution and with water, and was dried. The solvent was evaporated, and the residue was distilled. There were recovered 53.7 grams (66.5% yield) of dibromo methyl bicyclo(2.2.1)-2-heptyl ketone, boiling point 100.5–105° C. at 0.1–0.15 mm. mercury pressure. Refractive index ($n$ 32/D) 1.5523. *Analyses.*—Found, 54.4% Br; calculated for $C_9H_{12}Br_2O$, 54.1% Br. The probable planar structural formula for the dibromo methyl bicyclo(2.2.1)-2-heptyl ketone prepared in this example is as follows:

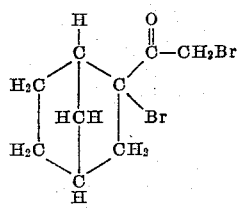

EXAMPLE III

To 27.4 grams of methyl bicyclo(2.2.1)-2-heptyl ketone containing 0.1 gram benzoyl peroxide there were added 54 grams of sulfuryl chloride. The mixture was heated under reflux for two hours at which time and an additional 27 grams of sulfuryl chloride were added. After refluxing the mixture for an additional hour, the mixture was diluted with an equal volume of benzene, washed with aqueous sodium bicarbonate solution and then with water. The washed solution then was dried and the benzene was evaporated off. Upon distillation of the residual oil there were recovered 12.4 grams (30% yield) of dichloro methyl bicyclo(2.2.1)-2-heptyl ketone, boiling at 81–96° C. under 0.7 mm. mercury pressure. Higher halogenated ketones were also separated as higher boiling fractions. Refractive index of the dichloro methyl bicyclo(2.2.1)-2-heptyl ketone ($n$ 30/D) 1.5031. *Analyses.*—Found, 35.0% Cl; calculated for $C_9H_{12}Cl_2O$, 34.3% Cl. The probable structure of the dichloro methyl bicyclo(2.2.1)-2-heptyl ketone in planar representation is as follows:

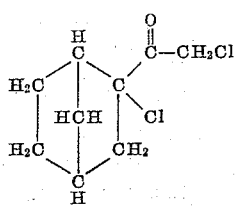

EXAMPLE IV

Gaseous HBr was bubbled at 0° C. into a well-stirred solution of methyl bicyclo(2.2.1)-5-hepten-2-yl ketone in pentane while irradiating the reaction mixture with ultraviolet light. After approximately the theoretical amount of HBr had been absorbed the solution was washed with dilute aqueous sodium bicarbonate solution, the washed solution was dried, and the pentane evaporated. The principal product of the hydrobromination was methyl 5(or 6)-bromobicyclo(2.2.1)-2-heptyl ketone, the structure of which can be shown in planar representation as follows:

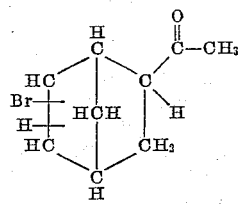

To a solution of 30.9 grams of the hydrobromination products in 100 ml. carbon tetrachloride there were added 45.6 grams of bromine, dropwise with stirring over a period of two hours at room temperature. The reaction mixture then was washed with water, dried, decolorized and freed of solvent. The viscous residue was dissolved in one-half its volume of isopropyl ether and chilled to give 16.6 grams of precipitate. The precipitate was recrystallized from hexane-diethyl ether mixture to give 9 grams of tribromo ketone, melting point 93–94° C. The mother liquors from the recrystallizations were freed of solvent to give an additional 40 grams of product as a thick liquid. The probable structure of the tribromo ketone is represented in planar representation by the following formula:

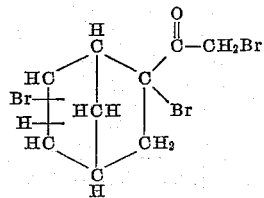

Analysis of the solid tribromo ketone: Found, 28.7% C, 2.89% H, 64.4% Br; analysis of the liquid product: Found, 30.4% C, 3.28% H, 63.1% Br; calculated for $C_9H_{11}Br_3O$, 28.8% C, 2.94% H, 64.1% Br.

EXAMPLE V

For monobromination of the methyl bicyclo(2.2.1)-2-heptyl ketone the ketone was treated with an equimolar amount of bromine. Thus, 19.2 grams of bromine were slowly added with stirring to a solution of 16.5 grams of methyl bicyclo(2.2.1)-2-heptyl ketone, prepared as in Example I, in 150 ml. of carbon tetrachloride, at 0° C. over a period of 30 minutes. The mixture was allowed to come to room temperature, washed with water, dried, freed of solvent, and distilled to give 13 grams (50% yield) of monobromo ketone, boiling point 68–72° C. under 0.35–0.4 mm. Hg pressure. Refractive index of the product ($n$ 35/D) 1.5101. *Analyses.*—Found, 37.4% Br; calculated for $C_9H_{12}BrO$, 36.9% Br.

Examples VI through XII, which follow, describe illustrative preparations of novel polyhalogeno bicyclo ketones of the invention utilizing the procedure wherein a cyclic pentadienyl hydrocarbon is first chlorinated to yield a polychlorocyclopentadiene and the polychlorocyclopentadiene is reacted by a Diels-Alder reaction with an alpha, beta-ethylenically unsaturated ketone to yield an adduct which then is preferably further halogenated by bromination. In Examples VI and VII the products are prepared from hexachlorocyclopentadiene. In Examples VIII through XII the polychlorocyclopentadiene used as starting material is 1,2,3,4-tetrachloro-1,3-cyclopentadiene.

EXAMPLE VI

There were mixed 273 grams of hexachlorocyclopentadiene, 82.4 grams of an 85:15 mixture of methyl vinyl ketone and water (azeotropic mixture) and 3 grams of 2,5-ditertiary butyl hydroquinone and the mixture was heated to reflux at 80° C. The heating was continued for ten hours during which time the reaction temperature was allowed to rise more or less continuously to a final temperature of 125° C. The product, which solidified upon cooling, was decolorized and recrystallized from methanol solution to yield 259.3 grams (75.7% yield) of methyl hexachlorobicyclo(2.2.1)-5-hepten-2-yl ketone, melting point 74.0–74.5° C. The probable structure for the product is described in planar representation by the following formula:

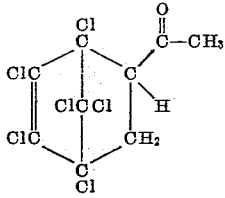

*Analyses.*—Found, 61.9% Cl; calculated for $C_9H_6Cl_6O$, 62.1% Cl.

EXAMPLE VII

To a solution of 425 grams of methyl 1,4,5,6,7,7-hexachlorobicyclo(2.2.1)-5-hepten-2-yl ketone in 1275 ml. carbon tetrachloride there was slowly added an equimolar amount (200 grams) of bromine. During the addition of the bromine, which took 1.5 hours, the mixture was stirred and irradiated with ultraviolet light. At the end of the reaction, HBr was swept from the mixture by bubbling nitrogen through the mixture. The mixture then was washed with dilute aqueous sodium bisulfite solution followed by a water wash. The reaction mixture then was dried over anhydrous sodium sulfate and drierite, the solvent was removed by evaporation in vacuo, and the product was recrystallized several times from carbon tetrachloride-methanol mixture to yield 370 grams (70.7% yield) of bromo hexachloro methyl bicyclo-(2.2.1)-5-hepten-2-yl ketone, melting point 92.5–93° C. The probable structure for the product, shown in planar representation, is as follows:

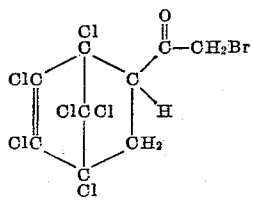

*Analyses.*—Found, 26.2% C, 1.38% H, 59.0% mixed halogen calculated as Cl, 1 equivalent Br per Kurt Meyer method; calculated for $C_9H_5BrCl_6O$, 25.7% C, 1.19% H, 58.9% mixed halogen calculated as Cl, 1 equivalent Br per Kurt Meyer method.

EXAMPLE VIII

There were mixed 102 grams of 1,2,3,4-tetrachloro-1,3-cyclopentadiene (prepared by reduction of hexachlorocyclopentadiene), 41.2 grams of an 85:15 mixture of methyl vinyl ketone and water (azeotropic mixture) and 1 gram of 2,5-ditertiary butyl hydroquinone and the mixture was warmed gently with stirring. The reaction was only mildly exothermic at about 20° C.; when the reaction temperature had risen to 45–50° C., the exothermicity of the reaction was easily noticeable. The reaction temperature was allowed to reach 115° C. and maintained there for 25 minutes. The mixture then was allowed to cool and was recrystallized several times from methanol to give 72.8 grams (53.1% yield) of colorless crystalline methyl 1,4,5,6-tetrachlorobicyclo(2.2.1)-5-hepten-2-yl ketone, melting point 51–51.5° C. *Analyses.*—Found, 39.8% C, 2.95% H, 51.7% Cl; calculated for $C_9H_8Cl_4O$, 39.4% C, 2.29% H, 51.8% Cl.

EXAMPLE IX 404 grams of 1,2,3,4-tetrachloro-1,3-cyclopentadiene were added portionwise with stirring to a mixture of 144.2 grams methyl vinyl ketone and 26 ml. water over a period of two hours at 30–40° C. After standing overnight the mixture was dehydrated and the organic residue was chilled mildly to yield a crude solid material which after recrystallization from isopropyl ether gave 136 grams (25% yield) of methyl 1,4,5,6-tetrachlorobicyclo-(2.2.1)-5-hepten-2-yl ketone, melting point 67.5–68.5° C. Intense chilling of the mother liquors yielded a second lot of crystals, which after crystallizataion from pentane, gave 150 grams of methyl 1,4,5,6-tetrachlorobicyclo-(2.2.1)-5-hepten-2-yl ketone, melting point 50–51° C. The viscous mother liquid from the second lot of crude crystals then was distilled to give a liquid product, boiling point 93–95° C. under 0.4 mm. mercury pressure. The distillate was recrystallized from methanol to yield an additional 22 grams of methyl 1,4,5,6-tetrachlorobicyclo(2.2.1)-5-hepten-2-yl ketone, melting point 50–51° C., making a total of 172 grams (31.6% yield) of the isomer melting at 50–51° C. It is our present belief that the isomer melting at 67.5–68.5° C. is the endo isomer and that the isomer melting at 50–51° C. and the product of the preceding example are the exo isomer. The structures for these isomers, in three-dimensional representation, can be written as follows:

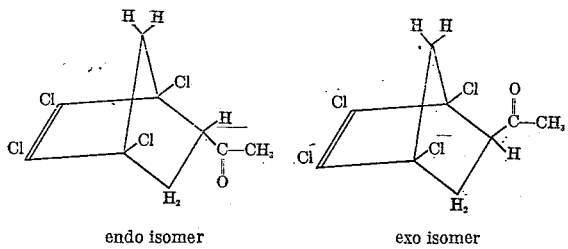

endo isomer      exo isomer

*Analyses.*—Found for endo isomer (M. P. 67.5–68.5° C.), 51.8% Cl, found for exo isomer (M. P. 50–51 C.), 39.8% C, 2.95% H, 51.7% Cl; calculated for $C_9H_8Cl_4O$, 39.4% C, 2.92% H, 51.8% Cl.

EXAMPLE X

The exo isomer of methyl 1,4,5,6-tetrachlorobicyclo-(2.2.1)-5-hepten-2-yl ketone was monobrominated to yield a separable mixture of monobromo tetrachloro bicycloheptenyl ketones. Eleven grams of bromine were edded dropwise with stirring to a solution of 18.6 grams of the exo isomer of methyl 1,4,5,6-tetrachlorobicyclo-(2.2.1)-5-hepten-2-yl ketone in 150 ml. carbon tetrachloride over a period of one hour at 0–5° C. The mixture then was allowed to come to room temperature during which time it was vigorously stirred to facilitate removal of HBr formed during the reaction. The mixture then was washed with water, dried, freed of solvent, and fractionally recrystallized from hexane to yield two fractions of bromo tetrachlorobicycloheptenyl ketone. The first fraction, melting point 95–96° C., 18% yield, had the probable structure of bromomethyl 1,4,5,6-tetrachlorobicyclo(2.2.1)-5-hepten-2-yl ketone. The second fraction, melting point 81.5–82° C., yield 11%, had the probable structure of methyl 2-bromo-1,4,5,6-tetrachlorobicyclo(2.2.1)-5-hepten-2-yl ketone. *Analyses.*—Found for isomer M. P. 95–96° C., 30.6% C, 2.13% H, found for isomer M. P. 81.5–82° C., 30.7% C, 1.88% H; calculated for $C_9H_7BrCl_4O$, 30.6% C, 1.98% H.

EXAMPLE XI

The endo isomer of methyl 1,4,5,6-tetrachlorobicyclo-(2.2.1)-5-hepten-2-yl ketone was brominated to yield a mixture of bromo tetrachlorobicycloheptenyl ketones. To a solution of 94 grams of the endo isomer of methyl 1,4,5,6-tetrachlorobicyclo(2.2.1)-5-hepten-2-yl ketone in 400 ml. carbon tetrachloride there were added 54.9 grams of bromine. The bromine was added dropwise with stirring over a period of 4½ hours at 0–5° C. After storage at ice temperatures for 48 hours the mixture was freed from solvent and the residue was fractionally recrystallized from hexane to give two fractions of product. The first fraction, melting point 95–96° C., 35% yield, had the probable structure of bromomethyl 1,4,5,6-tetrachlorobicyclo(2.2.1)-5-hepten-2-yl ketone and appeared to be identical to the product of the preceding example having the same melting point. The second fraction, melting point 56–57° C., yield 10%, had the probable structure of methyl 2-bromo-1,4,5,6-tetrachlorobicyclo(2.2.1)-5-hepten-2-yl ketone. *Analyses.*—Found for the isomer M. P. 95–96° C., 30.6% C, 2.13% H, found for the isomer M. P. 56–57° C., 30.4% C, 2.01% H; calculated for $C_9H_7BrCl_4O$, 30.6% C, 1.98% H.

The isomer, melting point 56–57° C., having the probable structure of methyl 2-bromo-1,4,5,6-tetrachlorobicyclo(2.2.1)-5-hepten-2-yl ketone, for purposes of convenience may referred to as the alpha isomer. The isomer, prepared in the preceding example and melting at 81.5–82° C., may be referred to as the beta isomer. The probable planar structures for these products can be represented as follows:

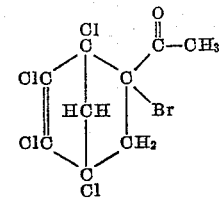

(endo and exo isomers)

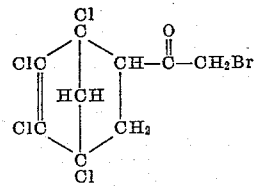

EXAMPLE XII

The endo and exo isomers of methyl 1,4,5,6-tetrachlorobicyclo(2.2.1)-5-hepten-2-yl ketone were separately brominated to yield a dibromo tetrachlorobicycloheptenyl ketone. The brominations were carried out by slow addition of 2 molecular equivalents of bromine to each of separate solutions (about 25%w) of the intermediate ketone in carbon tetrachloride, with stirring and with ultraviolet irradiation. After removal of HBr and the solvent, the respective products were recrystallized, from hexane or methanol, to yield the dibromo tetrachlorobicycloheptenyl ketone. The dibromide of the exo isomer of methyl 1,4,5,6-tetrachlorobicyclo(2.2.1)-5-hepten-2-yl ketone, obtained in 28% yield, melted at 118.5–119.5° C. The dibromide of the endo isomer of methyl 1,4,5,6-tetrachlorobicyclo(2.2.1)-5-hepten-2-yl ketone, obtained in 30% yield, melted at 118–119° C. The melting point of the mixed products showed no depression, indicating identity between the two products. The probable structure of the dibromide is that of bromomethyl 2-bromo-1,4,5,6-tetrachlorobicyclo(2.2.1)-5-hepten-2-yl ketone. Bromomethyl 2-bromo-1,4,5,6-tetrachlorobicyclo(2.2.1)-5-hepten-2-yl ketone can also be prepared by further bromination of the products shown in the preceding two examples. *Analyses.*—Found, 25.1% C, 1.44% H, 48.9% mixed halogen calculated as Cl; calculated for $C_9H_6Br_2Cl_4O$, 25.0% C, 1.39% H, 49.3% mixed halogen calculated as Cl.

Example XIII illustrates the preparation of an addition product of a lower aliphatic acyl chloride and a monoethylenically unsaturated bicyclic hydrocarbon and bromination of the addition product to produce a novel dibromo chloro polycyclo ketone of the present invention.

EXAMPLE XIII

To a mixture of 22.5 grams of anhydrous stannic chloride and 50 ml. carbon disulfide at −10° C. there was added with stirring over a period of 30 minutes a mixture of 30 grams bicyclo(2.2.1)-2-heptene and 25.2 grams acetyl chloride and the reaction mixture was then cooled to −30° C. Cooled 6 N HCl was then added slowly with stirring and cooling. The resulting mixture was extracted with diethyl ether and the extract was washed successively with dilute hydrochloric acid, water, dilute sodium carbonate solution and water, after which it was dried over anhydrous sodium sulfate and freed of solvent by evaporation. Upon distillation there were obtained 14 grams of product boiling from 107–131° C. under 20 mm. mercury pressure. On refractionation there were obtained 7 grams of purified product distilling at 69–78° C. under 0.8 mm. mercury pressure. The addition product, namely, methyl 3 - chlorobicyclo-(2.2.1)-2-heptyl ketone, having the formula shown in planar representation is as follows:

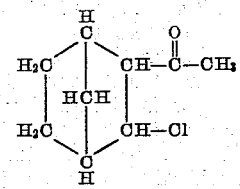

*Analyses.*—Found, 20.2% Cl; calculated for $C_9H_{12}ClO$, 20.6% Cl.

Similar results were obtained utilizing a modified procedure in which a mixture of anhydrous stannic chloride and acetyl chloride was added to an equimolar mixture of bicyclo(2.2.1)-2-heptene and acetyl chloride at 60° C. with a one-hour reaction period.

It appears to be probable that the addition products of bicyclo(2.2.1)-2-heptene and acetyl chloride prepared by the foregoing methods are mixtures of the endo and exo isomers of methyl 3-chlorobicyclo(2.2.1)-2-heptyl ketone. 2,4-dinitrophenylhydrazones of the addition products were made in the usual manner. Two different hydrazones were identified. One melted at 183–184° C. and the other melted at 157–159° C. A mixture of the two showed depression of the melting point. The hydrazone melting at 183–184° C. was found to be less soluble in ethyl acetate than the hydrazone melting at 157–159° C.

Dibromination of the mixed isomeric methyl 3-chlorobicyclo(2.2.1)-2-heptyl ketone led to mixed isomers of dibromomethyl chlorobicyclo(2.2.1)-2-heptyl ketone. The bromination is shown in the next example.

EXAMPLE XIV

Twenty-four grams of bromine were added dropwise with stirring to a solution of 12.8 grams of the redistilled addition products of bicyclo(2.2.1)-2-heptene and acetyl chloride, in 60 ml. carbon tetrachloride over a period of six hours at room temperature. The reaction was aided by ultraviolet irradiation towards the end. After standing overnight, the reaction mixture was washed with water, dried, freed of solvent and distilled to give 8.6 grams (34.6% yield) of chlorodibromo ketone, boiling point 120–127.5° C. under 0.25 mm. mercury pressure, refractive index ($n$ 28/D) 1.5696. The product of this example analyzed as a mixture of stereoisomers of bromomethyl 2-bromo-3-chlorobicyclo(2.2.1)-2-heptyl ketone having the planar structural formula as follows:

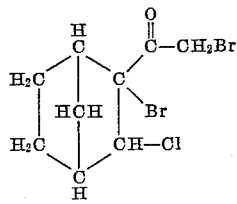

*Analyses.*—Found, 31.2% C, 3.44% H, 31.5% mixed halogen calculated as Cl; calculated for $C_9H_{11}Br_2ClO$, 32.6% C, 3.32% H, 32.2% mixed halogen calculated as Cl.

Example XV illustrates the preparation of an addition product of a diethylenically unsaturated bicyclic hydrocarbon and a lower acyl halide, which product comprises a monohalo-substituted tricyclic ketone, namely, methyl 5 - bromotricyclo$(2.2.1.0^{2,6})$ - 3-heptyl ketone. Novel ketones of the present invention are prepared from this addition product by halogenation according to procedures illustrated in Examples XVI, XVII and XVIII.

EXAMPLE XV

There were mixed at room temperature 92 parts by weight of bicyclo(2.2.1)-2,5-heptadiene and 123 parts by weight of acetyl bromide. To the mixture there were slowly added with stirring 5 parts by weight of stannic bromide. The temperature of the reaction mixture increased to 65° C. during 20 minutes; the mixture thereafter was maintained at about 65° C. for approximately one hour with the aid of cooling. The mixture then was cooled to room temperature and poured with stirring into an equal volume of water. The separated organic phase was diluted with an equal volume of benzene, washed successively with water, diluted and distilled in vacuo. There were separated 80 parts (40% yield) of addition product, boiling point 100–102° C. under 1.4 mm. mercury pressure. The product was a colorless liquid, refractive index ($n$ 22/D) 1.5302. Analyses and chemical properties indicated the product to have the structure shown in planar representation as follows:

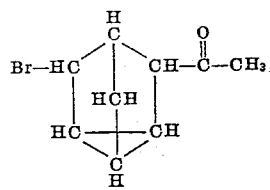

*Analyses.*—Found, 51.0% C, 5.1% H, 37.1% Br; calculated for $C_9H_{11}BrO$, 50.3% C, 5.1 H, 37.2% Br. The hydrogenation number of the product was found to be 0.

EXAMPLE XVI

To a solution of 32 parts by weight of the addition product prepared in the preceding example dissolved in 150 parts by weight of carbon tetrachloride there was added dropwise a solution of 24 parts by weight of bromine in 60 parts by weight of carbon tetrachloride. The addition was carried out at room temperature with constant stirring. A stream of nitrogen gas was passed through the solution to remove HBr. The solvent was removed by evaporation and the residue was distilled in vacuo. There were recovered 39 parts by weight (70% yield) of dibromo ketone, boiling point 110–121° C. under 0.1 mm. mercury pressure. The product appeared to comprise principally the tricyclic ketone, methyl 3,5-dibromotricyclo$(2.2.1.0^{2,6})$-3 - heptyl ketone having the following planar structural formula:

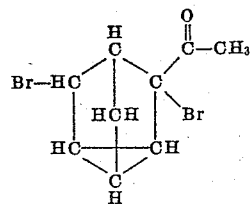

*Analyses.*—Found, 36.6% C, 3.1% H, 54.0% Br; calculated for $C_9H_{10}Br_2O$, 36.7% C, 3.4% H, 54.4% Br.

EXAMPLE XVII

To 32 parts by weight of the addition product of Example XV dissolved in 300 parts by weight of carbon tetrachloride there were added dropwise at room temperature 48 parts by weight of bromine. The resulting mixture was washed successively with water, dilute aqueous sodium bisulfite solution, and water, and then dried and distilled in vacuo. There were obtained 45 parts by weight (80% yield) of tribromo ketone, boiling point 143–155° C. under 0.8 mm. mercury pressure. The probable structure for the product can be described by the following planar structural formula:

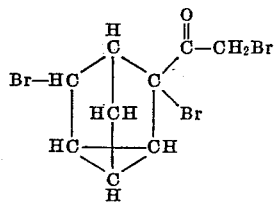

*Analyses.*—Found, 29.9% C, 2.6% H, 64.7% Br; calculated for $C_9H_9Br_3O$, 28.9% C, 2.4% H, 64.3% Br.

EXAMPLE XVIII

To 32 parts by weight of the addition product of Example XV, there were added slowly with stirring 41 parts by weight of sulfuryl chloride. The mixture then was heated under reflux for 45 minutes when a further 10 parts by weight of sulfuryl chloride were added. After refluxing for an additional 15 minutes the mixture was distilled in vacuo. The product, dichloro bromo tricyclo ketone, was recovered in 65% yield in the form of a colorless liquid, boiling point 110–124° C. under 0.5 mm. mercury pressure, refractive index ($n$ 18/D) in 1.5550. The probable structure of the product, shown in planar representation, is as follows:

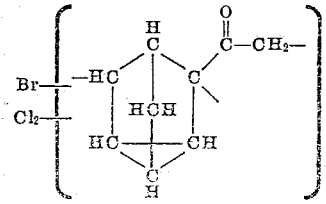

*Analyses.*—Found, 38.6% C, 3.2% H, 38.4% mixed halogen calculated as Cl; calculated for $C_9H_9BrCl_2O$, 38.0% C, 3.2% H, 37.5% mixed halogen calculated as Cl.

The following example illustrates the preparation of a novel alpha-bromo polyhalogeno alkyl polycyclyl ketone of the invention by reaction of an alpha-bromo acyl halide and a bicyclic dienic hydrocarbon.

EXAMPLE XIX

To a mixture of 202 grams of bromoacetyl bromide and 92 grams of bicyclo(2.2.1)-2,5-heptadiene at room temperature there were slowly added 10 ml. of stannic chloride. The mixture was heated to 60° C. for four hours and then cooled and stirred for 16 hours at room temperature. The mixture then was poured over cracked ice, the separated organic layer, diluted with an equal volume of benzene, was washed with dilute sodium bicarbonate solution and water, and the washed solution was dried, filtered, and the filtrate was evaporated. Upon distillation of the residual oil there were recovered 18 grams of product, boiling at 78–89° C. under 0.1 mm. mercury pressure. The redistilled product boiled at 84–88° C. under 0.1 mm. mercury pressure. The probable structure of the principal product, in planar representation, is as follows:

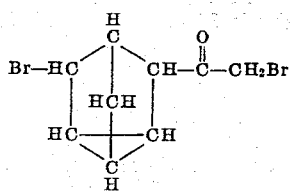

The presence of the related compounds described by the structures

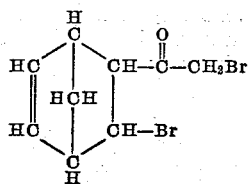

and

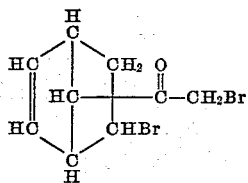

appears to be not unlikely.

Example XX illustrates the preparation of monochloro ketones (CMK) by reaction of acetyl chloride and bicyclo-(2.2.1)-2,5-heptadiene. Particularly valuable products of the invention are obtained by brominating and also by hydrobrominating and brominating the intermediate products illustrated in Example XX. It is especially desirable that such intermediate product be one having a high unsaturation value, preferably an unsaturation value corresponding to a content of monoethylenically unsaturated ketone of the empirical formula $C_9H_{11}ClO$ between about 50% and about 90% by weight. Preparation of an intermediate ketone having such a high unsaturation value is illustrated in Example XX. Preparation of monobromo CMK is illustrated in Example XXI. Preparation of dibromo CMK is illlustrated in Example XXII. Bromination of dibromo CMK to produce tribromo CMK is illustrated in Example XXIII. A modified procedure for preparation of a tribromo CMK is shown in Examples XXIV and XXV.

EXAMPLE XX

A. With fused zinc chloride as catalyst

There were mixed at 19° C. with vigorous stirring 526 grams of bicyclo(2.2.1)-2,5-heptadiene, 431.8 grams of acetyl chloride and 25 grams of fused zinc chloride. With cooling as required the temperature of the mixture was allowed to rise spontaneously to 41° C. over 2.6 hours and then to 75° C. over the next 1.25 hours, at which time the reaction was complete as judged by cessation of evolution of heat. The mixture was allowed to cool and was washed with water, dried and distilled. There were recovered 518.7 grams of chloro-substituted ketone distilling between 59 and 75° C. under 0.5–0.6 mm. mercury pressure. 55.3% yield. Refractive index ($n$ 25/D) 1.5045.

Similar results were obtained when the reaction was carried out in an excess (100%) of the bicyclo(2.2.1)-2,5-heptadiene as solvent and at the boiling point of the reaction mixture. Yield, 58%.

The reaction of equimolar amounts of bicyclo(2.2.1)-2,5-heptadiene and acetyl chloride in anhydrous nitromethane as solvent and with zinc chloride as catalyst, conducted at temperatures commencing with the initial boiling temperature of the reaction mixture and increasing over about two hours to 80–90° C., led to a 49% yield of addition product having an unsaturation value of 33.5%. When the run was duplicated except that after heating the reaction mixture was allowed to stand overnight at room temperature the yield of product was 54.3%, unsaturation value 8.3%. The reduced unsaturation value indicates isomerization of bicyclic ethylenically unsaturated ketone to tricyclic saturated ketone. By unsaturation value, there is meant the percentage content of bicyclic ethylenically unsaturated ketone in the product, assuming the product to consist exclusively of bicyclic ethylenically unsaturated ketone and tricyclic saturated ketone.

B. With anhydrous stannic chloride as catalyst

One ml. of stannic chloride dissolved in 5 ml. of acetyl chloride was added with stirring to a mixture of 46 grams of bicyclo(2.2.1)-2,5-heptadiene and 35 grams of acetyl chloride at −10° C. Over 6 minutes the temperature rose to 50° C. where it was held by cooling for 10 minutes. The temperature then was allowed to rise to 105° C. where it was held for 13 minutes. After cooling the mixture was washed with dilute hydrochloric acid and water and then dried, freed of solvent, and distilled. There were obtained 45.4 grams of mixed chloro methyl tricycloheptyl ketone and chloro methyl bicycloheptenyl ketone, unsaturation value 11%.

In the presence of an excess of the bicyclo(2.2.1)-2,5-heptadiene as solvent at about 40° C., the reaction of bicyclo(2.2.1)-2,5 heptadiene and acetyl chloride gave a 51% yield of product, unsaturation value 25%. Other solvents, such as carbon disulfide and nitromethane, may be used.

C. With anhydrous aluminum chloride as catalyst

At −5 to −10° C., equimolar amounts of bicyclo-(2.2.1)-2,5-heptadiene and acetyl chloride in the presence of carbon disulfide as solvent and anhydrous aluminum chloride (1 mole per mole of organic reactants) formed a reddish-brown solid complex which could be decomposed by pouring the entire mixture over a mixture of crushed ice and 6 N HCl. Upon separating and distilling the organic layer there was obtained a 49% yield of product, boiling point 124–133° C. under 17.5–19.5 mm. mercury pressure, refractive index ($n$ 31/D) 1.5034.

The addition products of bicyclo(2.2.1)-2,5-heptadiene and acetyl chloride prepared in the preceding examples can be separated into at least two isomeric ketones by careful fractional distillation. In an illustrative experiment there was obtained one fraction boiling at 76.3–78.7° C. under 1.7–2.0 mm. mercury pressure, unsaturation value 93%, refractive index ($n$ 34/D) 1.4971. A second fraction boiled at 83.8–86.3° C. under 1.9–2.1 mm. mercury pressure, unsaturation value 0, refractive index ($n$ 30/D) 1.5027. By infrared analysis the structure of the lower boiling of these two fractions was found to be bicycloheptenic. By infrared analysis the structure of the higher boiling fraction was shown to contain the tricyclo(2.2.1.0$^{2,6}$)-heptyl radical. Semicarbazones of the respective fractions were prepared and may be compared as follows:

TABLE 1

| Boiling Point (° C./mm. Hg) of Fraction | Melting Point (° C.) of Semicarbazone | Analysis, Percent of Semicarbazone | | | |
|---|---|---|---|---|---|
| | | C | H | N | Cl |
| 76.3–78.7/1.7–2.0 | 176–178 | 53.1 | 6.20 | | 15.3 |
| 83.8–86.3/1.9–2.1 | 224.5 | | | 18.9 | |
| Calculated for $C_{10}H_{14}ClN_3O$ | | 52.8 | 6.15 | 18.5 | 15.6 |

The probable structure for the tricycloheptyl ketone is that of methyl 5-chlorotricyclo(2.2.1.0$^{2,6}$)-3-heptyl ketone,

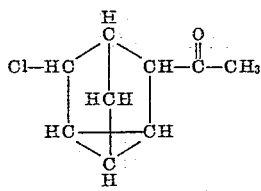

The probable structure of the ethylenically unsaturated ketone present in the products of Example XX is that of methyl 3-chlorobicyclo(2.2.1)-5-hepten-2-yl ketone.

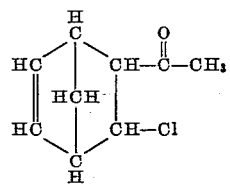

with indications of the presence also of the isomeric compound methyl 2-chlorobicyclo(2.2.1)-5-hepten-7-yl ketone

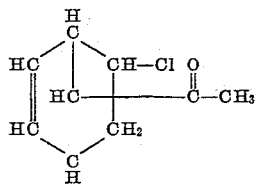

EXAMPLE XXI

To a solution of 51.2 grams of addition product of bicyclo(2.2.1)-2,5-heptadiene and acetyl chloride (which addition products we may refer to generically as CMK), boiling point 122–132° C. under 18 mm. mercury pressure, unsaturation value 18%, in 200 ml. carbon tetrachloride there were added 48 grams of bromine (equimolar amount) over a period of 1½ hours at room temperature. HBr formed during the reaction was removed by passing nitrogen through the mixture which was then washed with water, dried and distilled to give the product shown in the following table:

TABLE 2

| Fraction No. | Boiling Point, 0.1 mm. Hg | Amount, grams | Yield, Percent | Analysis, Percent | | |
|---|---|---|---|---|---|---|
| | | | | C | H | Mixed Halogen as Cl |
| F$_1$ | 98–104 | 6.2 | 8.3 | 46.2 | 4.53 | 27.5 |
| F$_2$ | 104–110 | 12.2 | 16.7 | 43.2 | 3.92 | 28.8 |
| F$_3$ | 109–113 | 9.2 | 12.3 | 42.1 | 4.08 | 28.8 |
| F$_4$ | 113–117 | 9.5 | 12.7 | 39.9 | 3.73 | 29.7 |
| Calculated for $C_9H_{10}BrClO$ | | | | 43.3 | 4.01 | 28.5 |

From elemental analyses, infrared spectra and other tests the product of this example is indicated to be a mixture of ketones of the formulas given under Example XX but substituted alpha to the carbonyl carbon atom by an atom of bromine. The principal product is believed to be alpha (or alpha')-bromo methyl 5-chlorotricyclo-(2.2.1.0$^{2,6}$)-5-heptyl ketone.

EXAMPLE XXII

A. *Starting material: CMK, unsaturation value 72%*

29.4 grams of bromine were added dropwise with stirring to a solution of 15 grams CMK, boiling point 71.7–75.3° C. under 1.9–2.1 mm. mercury pressure, unsaturation value 72%, and 75 ml. carbon tetrachloride over a period of 2½ hours. HBr formed during the reaction was removed by sweeping with nitrogen gas. The remaining mixture was washed with 1% sodium bisulfite solution and water. The product then was dried and distilled under a nitrogen atmosphere at reduced pressure to give the fractions shown in the following table:

TABLE 3

| Fraction No. | Boiling Point, ° C./ca. 0.4 mm. Hg | Yield, grams | Yield, percent | Refractive Index (n 30/D) | Analysis, percent | | |
|---|---|---|---|---|---|---|---|
| | | | | | C | H | Mixed Halogen as Cl |
| F$_1$ | 112–126 | 2.1 | 8.9 | 1.5719 | 32.9 | 2.72 | 31.6 |
| F$_2$ | 126–132 | 7.6 | 32.2 | 1.5774 | 32.0 | 2.86 | 32.2 |
| F$_3$ | 132–140 | 9.2 | 38.9 | 1.5908 | 29.5 | 2.57 | 32.9 |
| F$_4$ | undistilled residue. | 5.4 | 22.9 | | 27.9 | 2.16 | 33.3 |
| F$_5$ª | | 5.3 | | | | | |
| Calculated for $C_9H_9Br_2ClO$ | | | | | 32.9 | 2.74 | 32.2 |

ªCrude product withdrawn prior to distillation.

B. *Starting material: CMK, unsaturation value 4%*

The foregoing experiment was repeated using as the starting material CMK of unsaturation value 4%. The product fractions shown in the following table were separated by distillation:

TABLE 4

| Fraction No. | Boiling Point, ° C./mm. Hg | Yield, grams | Yield, percent | Refractive Index (n 25/D) | Mixed Halogen as Cl, percent |
|---|---|---|---|---|---|
| F$_1$ | 119–122/0.6 | 31.9 | 21.6 | 1.5670 | 31.6 |
| F$_2$ | 122–128/0.7 | 27.9 | 18.5 | 1.5729 | 32.2 |
| F$_3$ | 141–142/1.7 | 13.1 | 8.7 | 1.5752 | 32.7 |
| F$_4$ | 142–166/1.9 | 46.5 | 30.8 | 1.5787 | 32.6 |
| F$_5$ª | | 10.1 | | | |
| Calculated for $C_9H_9Br_2ClO$ | | | | | 32.4 |

ªCrude product withdrawn prior to distillation.

The principal components of the products in these two experiments is a mixture of the two ketones having the probable planar structural formulas:

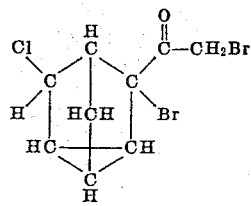

and

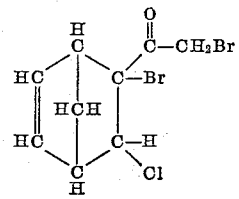

It also is believed that the following species may be present:

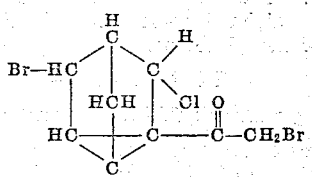

and

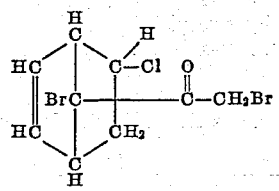

Where dibromo CMK is prepared from CMK having a relatively high unsaturation value, such as upwardly from about 50%, it is believed that the predominant constituents are one or more of the compounds represented by the second, third and fourth of these four formulas. The first of the four formulas represents the compound that is believed to be the most important substance in dibromo CMK prepared from CMK of low unsaturation value. The relatively greater fungicidal activity of the product from CMK of high unsaturation value is shown by a comparison of the tests of fraction F₂, Example XXII–A, and fraction F₂, Example XXII–B. The action of bicyclo(2.2.1)-2,5-heptadiene and acetyl chloride in the presence of a Friedel-Crafts catalyst may lead to reaction products having an unsaturation value generally not over about 35%. For preparation of CMK of higher unsaturation value than this, the crude product may be fractionally distilled, as illustrated in Example XX–C to recover CMK of any desired higher unsaturation value.

EXAMPLE XXIII

Sixty grams of dibromo CMK, prepared as in Example XXII and having a boiling point of 115–125° C. under 0.5 mm. mercury pressure, were dissolved in 200 ml. carbon tetrachloride and 35 grams of bromine were added. The reaction mixture was refluxed for 171 hours with ultraviolet irradiation and then washed, dried, decolorized with charcoal, and the solvent was evaporated. The 54 grams of crude product were dissolved in 1:1 hexane-ether. The solution was stored for five weeks at ice temperatures, at which time tribromo methyl 5-chlorotricyclo(2.2.1.0²,⁶)heptyl ketone was recovered as a white crystalline precipitate, melting point 113–114° C. *Analyses.*—Found, 26.6%, 1.97% H, 35.0% mixed halogen calculated as Cl; calculated for C₉H₈Br₃ClO, 26.6% C, 1.97% H, 34.8% mixed halogen calculated as Cl.

When the foregoing experiment was repeated, but with a reaction time of 84 hours, a 50 mole percent excess of bromine, and a dibromo CMK: solvent weight ratio of 1:5, there was recovered upon careful recrystallization of the product from hexane-ether a second tribromo ketone, melting point 104–104.5° C., and having the probable structure represented by the planar formula

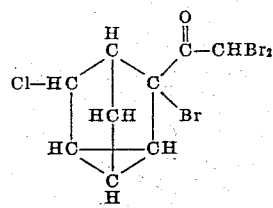

*Analyses.*—Found, 26.8% C, 2.12% H, 35.0% mixed halogen calculated as Cl; calculated for C₉H₈Br₃ClO, 26.5% C, 1.97% H, 34.8% mixed halogen calculated as Cl.

EXAMPLE XXIV

There were mixed 92 grams of CMK and 180 grams of an aqueous HBr solution prepared by dissolving 58 grams of gaseous HBr in 122 grams of 48% HBr solution with chilling in a Dry-Ice bath. The homogeneous solution was stored in a stoppered flask at room temperature for two days and then diluted with an ether-water mixture with separation of the organic layer which formed. The washed and dried organic layer was distilled to give 64 grams of bromo chloro ketone, boiling point 101–130° C. under 0.4–0.5 mm. mercury pressure. Yield, 47%. The probable structure is as follows in planar representation:

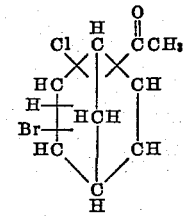

*Analyses.*—Found, 42.9% C, 4.77% H; calculated for C₉H₁₂BrClO, 43.0% C, 4.78% H.

EXAMPLE XXV

The product of the preceding example was brominated by adding 96.6 grams of bromine dropwise with stirring to a solution of 76 grams of the product in 375 ml. carbon tetrachloride over a period of four hours. After standing overnight, the mixture was washed with distilled water, dried, and decolorized, and the solvent was evaporated. One hundred thirty-five grams of the viscous liquid product was allowed to stand at 0 to −5° C. in diethyl ether and the crystals which continued to form were separated in two crops, one melting at about 118–132° C. and the second melting at about 80–93° C. The high-melting crude was recrystallized from carbon tetrachloride to give a white crystalline solid, melting point 135.5–136° C. The low-melting crude was washed with hexane to give a colorless crystalline solid, melting point 91–93° C. The two isomeric dibromo bromomethyl tricyclo(2.2.1.0²,⁶)-heptyl ketones were analyzed with the following results: found for isomer M. P. 135–136° C, 26.5% C, 2.52% H, 35.2% mixed halogen calculated as Cl, found for isomer M. P. 91–93° C., 34.9% mixed halogen calculated as Cl; calculated for C₉H₁₀Br₃ClO, 26.4% C, 2.45% H, 34.8% mixed halogen calculated as Cl.

It will be appreciated, of course, that the foregoing examples do not present an exhaustive exposition of the new and valuable products that can and have been prepared according to the present invention. Additional new and valuable compounds of the invention include, among others, the following:

The monobromide, having the probable structure of bromo isobutyryl 5-chlorotricyclo(2.2.1.0²,⁶)-3-heptyl ketone, of the addition product of bicyclo(2.2.1)-2,5-heptadiene and isobutyryl chloride; boiling point 105–116° C. under 1 mm. mercury pressure.

The monochloride, having the probable structure of chloro isobutyryl 5-chlorotricyclo(2.2.1.0²,⁶)-3-heptyl ketone, of the addition product of bicyclo(2.2.1)-2,5-heptadiene and isobutyryl chloride, boiling point 100–103° C. under 1 mm. mercury pressure.

The stereoisomeric methyl 2-methyl-1,4,5,6-tetrachlorobicyclo-(2.2.1)-5-hepten-2-yl ketones, one melting at 55–57° C. and the other melting at 106–107° C., formed by addition of 1,2,3,4-tetrachlorocyclopentadiene and methyl isopropenyl ketone.

The stereoisomeric bromomethyl 2-methyl 1,4,5,6-tetrachlorobicyclo(2.2.1)-5-hepten-2-yl ketones, one melting at 111–112° C. and the other melting at 126–127° C., formed by monobromination of the acetyl group of the addition products of 1,2,3,4-tetrachlorocyclopentadiene and methyl isopropenyl ketone.

Of the novel polyhalogeno-substituted polycyclyl ketones of the present invention, those which contain both chlorine and bromine in the molecule, and especially those in which bromine is substituted in position alpha (adjacent to) the ketonic carbonyl group, are the most highly desirable. It also is particularly desirable, from the standpoint of utility of the novel ketones as fungicides, that the polycyclyl radical (that is, the bicycloheptenyl radical, the bicycloheptyl radical, or the tricycloheptyl radical) contain seven carbon atoms only. The most desirable polyhalogeno-substituted polycyclyl ketones of the invention are those which contain nine carbon atoms only in the molecule.

The remarkable fungicidal properties of the novel products of the invention have been clearly established by numerous tests. For illustrative purposes there are shown in Table 5 test results which were obtained upon comparison of dibromo CMK with a number of commercially accepted fungicides. The tests were carried out by adding to cultures of *Streptomyces scabies*, *Verticillium abo-atrum*, *Glomerella cingulata*, *Rhizoctonia solani* and *Micrococcus pyogenes* var. *aureus*, in Emerson's broth [1] measured amounts of the test material from 1% acetone solution and observing the growth characteristics of the culture under standard conditions. The results shown in Table 5 were obtained.

TABLE 5

| Material Tested | Average Inhibiting Concentration of Active Ingredient, Micrograms per Ml. of Culture Medium |
| --- | --- |
| Dibromo CMK | 7.20 |
| HgCl₂ | 40.80 |
| Fermate a | 11.40 |
| Phygon b | 12.6 |
| Dithane c | 43.40 |
| Vancide d | 49.60 |
| Spergon e | 87.20 |
| Orthocide f | 23.40 |
| Lime sulfur | 76.40 |

Active Ingredients:
a Ferric dimethyl dithiocarbamate; du Pont.
b 2, 3-dichloro-1, 4-naphthoquinone; U. S. Rubber Company.
c Disodium ethylene bisdithiocarbamate; Rohm and Haas.
d Sodium salt of dimethyl dithiocarbamic acid; R. T. Vanderbilt Company.
e Tetrachloro-para-benzoquinone; U. S. Rubber Company.
f N-trichloromethylthiotetrahydrophthalimide; California Spray-Chemical Corporation.

Tests carried out under standardized conditions have further demonstrated the new products of the present invention to be effective against a wide variety of plant pathogens and animal pathogens. The results of in vitro tests of dibromo CMK, prepared as in Examples XX and XXII and tested by the standard broth dilution test described above are described in Table 6.

[1] Emerson's broth contains: Dextrose 10 grams, Bacto Peptone 4 grams, Yeast Extract 1 gram, sodium chloride 2.5 grams, Beef Extract 4 grams and distilled water 1 liter.

TABLE 6
[Toxicity spectrum of dibromo CMK.]

| Test Organism | Inhibiting Concentration, Micrograms per Ml. of Culture Medium |
| --- | --- |
| A. Plant Pathogens: | |
| *Aphanomyces euteiches* (root rot of peas) | 4–2 |
| *Bacterium solancearum* (bacterial wilt of tomatoes) | 4–2 |
| *Fusarium cubense* (banana wilt) | 4–2 |
| *Fusarium solani* f. *pisi* (foot rot of peas) | 32–16 |
| *Fusarium oxysporum* f. *lycopersici* | 16–8 |
| *Fusarium roseum* (potato tuber rot) | 2–1 |
| *Glomerella cingulata* (apple bitter rot) | 8–4 |
| *Madison 517* (wood rot) | 2–1 |
| *Monilia fructicola* (brown rot of peach) | 2–1 |
| *Penicillium* (species unknown) (citrus fruit rot) | 10–8 |
| *Phomopsis citri* (citrus stem end rot) | 2–1 |
| *Phtophtora parasistica* var. *nicotianae* (black shank of tobacco) | 2–1 |
| *Rhizoctonia* (bean st.) (stem canker) | 4–2 |
| *Rhizoctonia solani* (sore shin) | 8–4 |
| *Streptomyces scabies* (potato scab) | 4–2 |
| *Verticillium albo-atrum* (verticillium wilt) | 4–2 |
| *Venturiu inaequalis* (apple scab) | 2–1 |
| *Xanthomonas malvacearum* (angular leaf spot or black arm of cotton) | 31–16 |
| *Xanthomonas phaseoli* (bean blight) | 8–4 |
| *Solerotium rolfsii* (southern stem blight) | 125–62 |
| *Bacillus amylovorus* (fire blight of apples and pears) | 8–4 |
| *Alternaria solani* (potato early blight) | 4–2 |
| *Diplodia natalensis* (citrus stem end rot) | 2–1 |
| B. Animal Pathogens: | |
| *Blastomyces dermatitis* (cutaneous type) | 10 |
| *Candida albicans* (moniliasis) | 10 |
| *Coccidioides immitis* (coccidioidomycosis) | 10 |
| *Epidermphyton flocosum* (mycosis of skin and nails) | 10 |
| *Histoplasma capsalatum* (histoplasmosis) | 10 |
| *Miscrosporum audouini* (ringworm of scalp) | 10 |
| *Microsporum canis* St. 1 (ringworm in man) | 10 |
| *Microsporum canis* St. 2 (ringworm in man) | 10 |
| *Microsporum gypsum* (ringworm in man) | 10 |
| *Sporotrichum schenkii* (mycosis of skin) | 10 |
| *Trichlophyton faviforme* var. *descoides* (ringworm) | 10 |
| *Trichophyton mentagrophytes* (ringworm) | 10 |
| *Trichophyton rubrum* (mycosis of skin and nails) | 10 |
| *Trichophyton tensurans* (mycosis of skin and nails) | 10 |
| *Trichophyton violaceum* (endothrix infection of skin) | 10 |
| *Aspergillus fumigatus* (respiratory infection) | 4–2 |
| *Bacillus subtilus* (saprophyte) | 8–4 |
| *Brucella abortus* St. 19 (brucellosis) | 16–8 |
| *Escherichia coli* (saprophyte) | 31–16 |
| *Klebsiella pneumonia* (infection of nose and sinus) | 8–4 |
| *Micrococcus pyogenes* (various infections) | 8–4 |
| *Micrococcus pyogenes* var. *aureus* (various infections) | 16–8 |
| *Mycobacterium phlei* (non virulent tubercular strain) | 4–2 |
| *Mycobacterium tuberculosis* var. *hominis* St. 607 | 4–2 |
| *Neisseria catarrhalis* (respiratory infections) | 2–1 |
| *Proteus vulgaris* (facultative parasite) | 31 |
| *Pseudomonas aeruginosa* (suppurative infections) | 125–62 |
| *Salmonella choleraesuis* (gastroenteritis in man and hog cholera) | 8–4 |
| *Salmonella schotmulleri* (paratyphoid fever) | 4–2 |
| *Shigella dysenterias* (dysentery) | 8–4 |
| *Shigella paradysenteriae* (dysentery) | 62–31 |
| *Streptococcus agalactae* (mastitus) | 4–2 |

In vivo tests have confirmed the toxicity of dibromo CMK towards a variety of pathogens. Plants, laboratory test animals and human beings have been employed for the testes.

For example, dibromo CMK, prepared as in Examples XX and XXII, has been blended with a horticultural dust diluent (Attapulgus clay) in about equal proportions and the dust applied to seed at a rate of 0.25–8.0 ounces per bushel, with a marked increase in percentage germination, compared to untreated seed, when planted in soil infested with the pea seedling blight pathogens *Pythium ultimum*, *Fusarium solani* f. *pisi*, and *Aphanomyces euteiches*. When seed of the pea variety Alaska was treated with 5% dibromo CMK-Attapulgus clay dust and planted in infested soil, 80% germination of the treated seeds was observed. With untreated seeds, 34% germination was observed. Application of dibromo CMK as an about 0.1% solution in acetone or xylene to tomato plants infested with late blight of tomato, to celery plants infested with late blight of celery, and to bean plants infested with mildew and with rust, has shown dibromo CMK to have in vivo activity against these fungi. Dibromo CMK has also shown utility as a soil fumigant. A 0.004% solution of dibromo CMK in medicinal grade ethyl alcohol has been found to be highly effective for controlling fungus infections of the human skin, such as athlete's foot.

That the toxicity of the compounds of the present invention towards microorganisms is attributable inter alia to the presence of a plurality of atoms of halogen in the molecule has been evidenced by test results which are illustrated by those given in Table 7. The results were obtained by the standard dilution method described herein utilizing the indicated pathogens as test organisms.

phase. Fungicidal dusts may be prepared by adsorbing one or more of the novel products upon known dust carriers or diluents, such as clay, walnut shell flour, silica, and the like, with the aid of known adjuvants, such as sticking agents, if desired. For medicinal use, as for dermal application, the toxic agent may be carried on talcum powder or in a bland unguent or salve. For maximum stability of the novel toxic agents, especially in the presence of moisture, it is desirable that the acidity TABLE 7 [a]

| Material Tested | Pathogen | | | | | | | | | |
|---|---|---|---|---|---|---|---|---|---|---|
| | S. scabies | | V. albo-atrum | | R. solani | | G. cingulata | | S. aurens | |
| | 0 | + | 0 | + | 0 | + | 0 | + | 0 | + |
| Product of Ex. I; $C_9H_{14}O$ | | 125 | | 125 | | 125 | | 125 | | 125 |
| Product of Ex. V; $C_9H_{12}BrO$ | | 125 | | 125 | | 125 | | 125 | | 125 |
| Product of Ex. II; $C_9H_{12}Br_2O$ | 16 | 8 | 16 | 8 | 62 | 31 | 62 | 31 | 16 | 8 |
| Product of Ex. IV; M. P. 93-94° C., $C_9H_{11}Br_3O$ | 16 | 8 | 16 | 8 | 62 | 31 | 62 | 31 | | |

[a] Under the columns headed "0" and "+" there are shown the concentrations of the test material, in parts per million, which did and did not, respectively, inhibit the growth of the indicated test organism.

That fungicidal activity is generally characteristic of the novel products of the invention, is evidenced by the test results shown in Table 8. These results were obtained by the standard dilution method described hereinbefore.

(or alkalinity) of the suspending medium be adjusted to near neutrality, e. g., to a pH value between about 4 and about 8. Depending upon the site of application, the novel toxicants of the invention may be applied by dusting, TABLE 8 [a]

| Material Tested | Pathogen | | | | | | | | | |
|---|---|---|---|---|---|---|---|---|---|---|
| | S. scabies | | V. albo-atrum | | R. solani | | G. cingulata | | S. aurens | |
| | 0 | + | 0 | + | 0 | + | 0 | + | 0 | + |
| Product of Ex. VII; $C_9H_5BrCl_6O$ | 10 | 5 | 20 | 10 | 40 | 30 | 30 | 20 | | |
| Product of Ex. X; M. P. 81.5-82° C | 10 | 4 | 40 | 16 | 62 | 50 | 62 | 50 | 62 | 50 |
| Product of Ex. XI; M. P. 95-96° C | 8 | 4 | 16 | 8 | 62 | 31 | 62 | 31 | 62 | 31 |
| Product of Ex. XI; M. P. 56-57° C | 50 | 40 | 80 | 60 | 100 | 80 | | 125 | 62 | 31 |
| Product of Ex. XII; $C_9H_6Br_2Cl_4O$ | 10 | 5 | 20 | 10 | 20 | 10 | 50 | 40 | 60 | 50 |
| Product of Ex. XIV; $C_9H_{11}Br_2ClO$ | 16 | 8 | 8 | 4 | 16 | 8 | 40 | 30 | 62 | 31 |
| Product of Ex. XVI; $C_9H_{10}Br_2O$ | 16 | 8 | 4 | 2 | 16 | 8 | 62 | 31 | 62 | 31 |
| Product of Ex. XVII; $C_9H_9Br_3O$ | 4 | 2 | 4 | 2 | 4 | 2 | 16 | 8 | 16 | 8 |
| Product of Ex. XXI; Fraction $F_3$ | 8 | 4 | 8 | 4 | 16 | 8 | 31 | 16 | 31 | 16 |
| Product of Ex. XXII-A; Fraction $F_2$ | 2 | 1 | 1 | 0.5 | 1 | 0.5 | 16 | 8 | 16 | 8 |
| Product of Ex. XXII-B; Fraction $F_2$ | 4 | 2 | 4 | 2 | 8 | 4 | 16 | 8 | 16 | |
| Product of Ex. XXIII; M. P. 104-104.5° C | 4 | 2 | 4 | 2 | 31 | 16 | 31 | 16 | 31 | 16 |
| Product of Ex. XXV; Crude | 4 | 2 | 8 | 4 | 31 | 16 | 16 | 8 | 16 | 8 |
| M. P. 91-93° C | 4 | 2 | 6 | 4 | 10 | 8 | 10 | 8 | | |

[a] Under the columns headed "0" and "+" there are shown the concentrations of the test material, in parts per million, which did and did not, respectively, inhibit the growth of the indicated test organism.

New and improved fungicidal compositions may be prepared according to the invention by blending, mixing or dissolving the novel products of the invention with or in normally liquid or normally solid diluents, extenders, carriers, solvents, and the like, known to the art to be suitable for use in the preparation of fungicidal compositions. Fungicidal sprays may be prepared with the aid of solvents, such as acetone, xylene, selected mineral oil fractions, and the like. The solvent should, of course, be chosen with regard to the intended use for the spray; for example, for horticultural use the solvent should be one of low aromaticity, such as a light petroleum distillate having an unsulfonatable residue preferably greater than 85%. For medicinal use, solvents of medicinal grade, such as undenatured ethyl alcohol, isopropyl alcohol, acetone, and the like may be employed. Suitable horticultural sprays may comprise up to about 0.5% by weight of the active ingredient in solution in the solvent, together with wetting agents, spreading agents, penetrating agents, and other known adjuvants. More highly concentrated solutions may, of course, be prepared, for subsequent dilution to field strength. Polyphase compositions, such as oil-in-water or water-in-oil emulsions comprising more of the novel products of the invention may be prepared, as by emulsifying a solution in an organic solvent in an aqueous phase.

spraying, dipping, impregnation, by fumigation, or as an aerosol.

The new active agents of the invention may be employed alone or in conjunction with other active materials. For example, known insecticides, such as DDT, dieldrin, aldrin, aramite, and the like, may be incorporated in the horticultural compositions of the invention.

The new fungicides of the invention have shown evidence of utility for medicinal purposes. In agriculture, they may be used for combatting or for preventing infection of soil, seeds, living plants and trees, grain, fruits, such as citrus fruits, apples, plums, pears, peaches, and the like, and of other crops either prior to or after harvesting. They may be used for veterinarian purposes, as in the control of disease in chickens, cattle, horses, pigs, dogs, and other domestic or farm animals. Novel products of the invention have also been shown to be useful for rendering manufactured products resistant to attack by mold or fungi, as by impregnating the manufactured product with a dilute solution of the toxic agent or otherwise applying the toxic agent to the product or in the body thereof. Paper articles, such as paper itself, books and book bindings, manuscripts, currency, wallpaper, packing materials, and the like thus may be rendered mold resistant by application of toxic agents of the invention. Cloth and like products, with particular reference being made to tents, blankets, articles of clothing, and other fabric goods designed for use in tropical areas, advantageously can be impregnated with a solution of, for example, dibromo CMK, to impart greatly improved mold resistance. Electrical insulation, whether it be paper, cloth, or other material susceptible to attack by fungi, may be rendered resistant by impregnation with novel products of the invention. Wood and other cellulosic products may be rendered resistant to attack by microorganisms by impregnation with solutions of toxic agents of this invention. Novel products of the invention may be incorporated into surface coatings, such as paints, varnishes, etc., to render the dried coating resistant to attack by fungi. Surgical bandages may be impregnated. The novel products are thus widely applicable for fungicidal and bacteriocidal purposes and it is to be understood that it is not intended that the invention shall be limited to any one particular field of such utility.

Although the novel halogeno ketones of the invention are primarily useful as toxicants, they are not, in general, limited to such utility. They may be employed in appropriate cases as chemical intermediates, fire retardants, additives for lubricating oil compositions, and the like. In various cases, the additional feature that the novel products are also fungicidal may be very advantageous.

I claim as my invention:

1. A polyhalogeno alkyl polycyclyl ketone having a structure represented by the planar structural formula

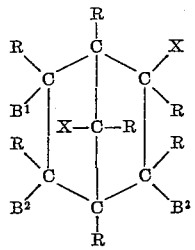

in which each X represents one of the class consisting of the group —CO—CR$_3$, hydrogen, and middle halogen, with the proviso that one, and only one, X represents the group —CO—CR$_3$, each R is selected from the class consisting of hydrogen, middle halogen and lower alkyl, with the proviso that not less than two of the substituents represented by X and R together be halogen; and B$^1$, B$^2$ and B$^3$ each represent valence bonds satisfied by attachment to one of the group consisting of hydrogen and carbon, with the proviso that when B$^2$ represents a valence bond satisfied by attachment to hydrogen B$^1$ and B$^3$ also represent valence bonds satisfied by attachment to hydrogen and the further proviso that when one of B$^1$ and B$^3$ represents a valence bond satisfied by attachment to carbon, B$^2$ also represents a valence bond satisfied by attachment to carbon and together with the said one of B$^1$ and B$^3$ forms a valence bond between the two carbons, and the other of said B$^1$ and B$^3$ represents a valence bond satisfied by attachment to hydrogen.

2. A polyhalogeno alkyl polycyclyl ketone having a structure represented by the planar structural formula

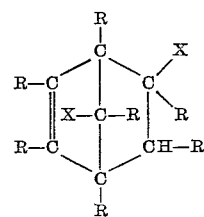

in which each X represents one of the class consisting of the group —CO—CR$_3$, hydrogen, and middle halogen, with the proviso that one, and only one, X represents the group —CO—CR$_3$, and each R is selected from the class consisting of hydrogen, middle halogen and lower alkyl, with the proviso that not less than two of the substituents represented by X and R together be halogen.

3. A polyhalogeno alkyl polycyclyl ketone having a structure represented by the planar structural formula

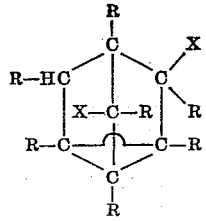

in which each X represents one of the class consisting of the group —CO—CR$_3$, hydrogen, and middle halogen, with the proviso that one, and only one, X represents the group —CO—CR$_3$, and each R is selected from the class consisting of hydrogen, middle halogen and lower alkyl, with the proviso that not less than two of the substituents represented by X and R together be halogen.

4. A polyhalogeno alkyl polycyclyl ketone defined by claim 1 which contains both bromine and chlorine and which has bromine substituted in alpha position relative to the carbonyl group.

5. As a new chemical compound, bromine-substituted methyl 1,4,5,6,7,7-hexachlorobicyclo(2.2.1)-5-hepten-2-yl ketone.

6. A compound defined by claim 5 which contains a plurality of atoms of bromine.

7. A compound defined by claim 5 which contains bromine in alpha position relative to the carbonyl group.

8. As a new chemical compound, bromomethyl 1,4,5,6,7,7-hexachlorobicyclo(2.2.1)-5-hepten-2-yl ketone.

9. As a new chemical compound, polyhalogeno-substituted methyl bicyclo(2.2.1)-5-hepten-2-yl ketone, the halogen whereof is middle halogen.

10. A compound defined by claim 9 which contains bromine in alpha position relative to the carbonyl group.

11. A compound defined by claim 9 which contains both bromine and chlorine as the halogen.

12. As a new chemical compound, polyhalogeno-substituted methyl tricyclo(2.2.1.0$^{2,6}$)heptyl ketone, the halogen whereof is middle halogen.

13. As a new chemical compound, bromine-substituted methyl chlorotricyclo(2.2.1.0$^{2,6}$)heptyl ketone.

14. A compound defined by claim 13 which contains at least one bromine atom in position alpha to the carbonyl group.

15. A compound defined by claim 13 in which each of the two carbon atoms adjacent to the carbonyl group is substituted by bromine.

16. Bromomethyl 3 - bromo - 5 - chlorotricyclo(2.2.-1.0$^{2,6}$)-3-heptyl ketone.

17. Bromo-substituted 3 - chlorobicyclo(2.2.1)-5-hepten-2-yl alkyl ketone having from one to three, inclusive, bromine atoms.

18. Dibromo - substituted 3 - chlorobicyclo(2.2.1)-5-hepten-2-yl alkyl ketone.

19. The mixture of polyhalogeno C$_9$ methyl polycyclyl ketones, the halogen whereof is middle halogen, produced by reacting bicyclo(2.2.1)-2,5-heptadiene and acetyl chloride in the presence of a Friedel-Crafts catalyst, hydrobrominating the product, and brominating the product of the hydrobromination.

20. The mixture of polyhalogeno C$_9$ methyl polycyclyl ketones, the halogen whereof is middle halogen, produced by reacting bicyclo(2.2.1)-2,5-heptadiene and acetyl chloride in the presence of a Friedel-Crafts catalyst and brominating the product.

21. The product defined by claim 20 in which the intermediate reaction product of the bicyclo(2.2.1)-2,5-heptadiene and acetyl chloride is one having an unsaturation value between about 50% and about 90%.

22. The product defined by claim 20 in which the intermediate reaction product of the bicyclo(2.2.1)-2,5-heptadiene and acetyl chloride is one having an unsaturation value less than 50%.

23. The method of inhibiting the growth of micro-organisms which comprises subjecting such micro-organisms to the action of a compound defined by claim 1.

24. The method of inhibiting the growth of fungi which comprises subjecting such fungi to the action of a compound defined by claim 4.

25. The method of inhibiting the growth of fungi which comprises subjecting such fungi to the action of a compound defined by claim 9.

26. The method of inhibiting the growth of fungi which comprises subjecting such fungi to the action of a compound defined by claim 12.

27. The method of controlling the growth of micro-organisms which comprises applying in the environment of the micro-organisms a product prepared by brominating a product of reaction of bicyclo(2.2.1)-2,5-pentadiene and acetyl chloride in the presence of a Friedel-Crafts catalyst.

28. The method of inhibiting the growth of micro-organisms which comprises subjecting such micro-organisms to the action of a product comprising bromomethyl 3-bromo-5-chlorotricyclo(2.2.1.0$^{2,6}$)-3-heptyl ketone.

29. The method of inhibiting the growth of micro-organisms which comprises subjecting such micro-organisms to the action of a product comprising dibromo-substituted chlorobicyclo(2.2.1)-5-hepten-2-yl ketone.

30. The method of preventing the growth of fungi on an object subject to attack by fungi which comprises applying to said object a fungistatic to fungicidal amount of a product defined by claim 1.

31. A fungicidal composition of matter comprising a product defined by claim 1 and a carrier adjuvant therefor.

32. A horticultural fungicide comprising a product defined by claim 1 and a horticultural carrier therefor.

33. A pulverulent horticultural fungicide consisting of a product comprising bromine-substituted methyl chlorotricyclo(2.2.1.0$^{2,6}$)-heptyl ketone adsorbed on a horticulturally inert dust carrier.

34. The method for the preparation of a polyhalogeno alkyl polycyclyl ketone which comprises polyhalogenating a bicyclo(2.2.1)-5-heptene-2-yl alkyl ketone to introduce a plurality of atoms of middle halogen into the molecule thereof.

35. The method of preparing a bromo polyhalogeno polycyclyl alkyl ketone, the halogen whereof is middle halogen, which comprises brominating a polychloro bicyclo(2.2.1)-5-heptene-2-yl alkyl ketone.

36. The method of preparing a polyhalogeno polycyclyl alkyl ketone, the halogen whereof is middle halogen, which comprises reacting a bicyclo(2.2.1)heptadiene and an acyl chloride in the presence of an acid catalyst and halogenating the reaction product thereof with a middle halogen.

37. The method of producing a polyhalogeno polycyclyl alkyl ketone, the halogen whereof is middle halogen, which comprises reacting bicyclo(2.2.1)-2,5-heptadiene and acetyl chloride in the presence of a Friedel-Crafts catalyst and brominating the reaction product thereof by reaction with elemental bromine.

38. The method defined by claim 37 in which the Friedel-Crafts catalyst is stannic chloride.

39. The method of producing a polyhalogeno polycyclyl alkyl ketone, the halogen whereof is middle halogen, which comprises reacting bicyclo(2.2.1)-2,5-heptadiene and acetyl chloride in the presence of a Friedel-Crafts catalyst, hydrobrominating the reaction product thereof, and brominating the product of the hydrobromination.

40. A fabric impregnated with a compound defined by claim 1 whereby the fabric is rendered resistant to fungi.

41. Cloth impregnated with a product defined by claim 20 whereby the cloth is rendered resistant to attack by fungi.

42. Paper impregnated with a product defined by claim 20 whereby the paper is rendered resistant to attack by fungi.

43. An article of manufacture treated with a product defined by claim 1, whereby the article of manufacture is rendered resistant to attack by fungi.

44. An article of manufacture treated with a product defined by claim 20 whereby the article of manufacture is rendered resistant to attack by fungi.

References Cited in the file of this patent

UNITED STATES PATENTS

| | | |
|---|---|---|
| 2,407,508 | Morris et al. | Sept. 10, 1946 |
| 2,657,168 | Buntin | Oct. 27, 1953 |

OTHER REFERENCES

Brown: Insect Control by Chemicals, 1951, p. 107.